United States Patent [19]

Lussiez et al.

[11] 4,065,105
[45] Dec. 27, 1977

[54] FLUIDIZING MEANS FOR REDUCING VISCOSITY OF SLURRIES

[75] Inventors: Guy W. Lussiez, Golden, Colo.; Hugh F. Reid, Union City, Calif.

[73] Assignee: Amax Inc., Greenwich, Conn.

[21] Appl. No.: 724,364

[22] Filed: Sept. 17, 1976

[51] Int. Cl.² .............................. B01F 7/16; B01F 9/00
[52] U.S. Cl. .................................... 366/348; 366/290; 366/303
[58] Field of Search ..................... 75/1 R, 1 T, 2, 3, 6, 75/5 R; 259/1 R, 145, 146, 147, 148, 153, 175, 176, 177 R, 8, 7, 81 R

[56] References Cited

U.S. PATENT DOCUMENTS

| | | | |
|---|---|---|---|
| 3,645,813 | 2/1972 | Pelikan | 259/147 |
| 3,669,417 | 6/1972 | Cornwell | 259/147 |
| 3,719,455 | 3/1973 | Ohono | 259/8 |
| 3,752,653 | 8/1973 | Weber | 259/8 |
| 3,756,570 | 9/1973 | Buhner | 259/7 |

*Primary Examiner*—Robert W. Jenkins
*Attorney, Agent, or Firm*—Kasper T. Serijan; Eugene J. Kalil

[57] ABSTRACT

Process and means are provided for reducing the viscosity of a work hardened slurry of finely divided ore having a pulp density of at least 15% by weight of solids, the process comprising, gently mechanically agitating a mass of said work hardened slurry confined in a container whereby to cause relative movement between said mass and a contacting surface such that said mass is subjected to shear forces, the relative movement being at a linear velocity sufficient to provide shear forces in said agitated mass in contact with the surface effective for reducing the viscosity to a desired level more than 50% below the original viscosity, and continuing said agitation at substantially said linear velocity until the viscosity has been reduced to said desired level. A rotating drum or a container with a stirring device may be employed for carrying out the invention.

11 Claims, 14 Drawing Figures

FIG.14

FLUIDIZING MEANS FOR REDUCING VISCOSITY OF SLURRIES

This invention relates to means and process for reducing the viscosity of slurries of finely divided ore, for example, such as the type of slurries produced from lateritic-limonitic nickel-cobalt ores in the hydrometallurgical recovery of metal values therefrom.

STATE OF THE ART

In recovering nickel, cobalt and other metal values from ores using hydrometallurgical techniques, such as leaching at atmospheric or superatomospheric pressure above ambient temperatures, it is conventional practice to form a slurry (e.g. a pulp) and pump it to the various treatment stages.

Because the slurry is generally vigorously agitated during the pumping thereof, depending upon the type of pump used, the speed of the slurries through the pipes and the percent solids being handled, the viscosity of the slurry tends to increase rather markedly such as to make subsequent handling of the slurry difficult. This is particularly the case where the slurry is made up of fibrous-type particles.

In order to reduce the amount of energy required to deliver such slurries to the various treatment stages, fluidizing agents have been used to decrease the viscosity thereof. The use of fluidizing agents, however, is costly; the agents are not always compatible with the process being used to recover the metal values; and, in some cases, certain of the fluidizing agents do not meet environmental pollution standards.

Lateritic and/or limonitic nickel-cobalt ores in the finely divided state are particularly subject to the aforementioned viscosity problems when slurried and vigorously agitated by pumping.

According to microscopic examination of lateritic nickel ore, the principal mineral goethite has a fiber-like crystal structure. When slurries of the ore are subjected to high shearing stress conditions, such as by means of a centrifugal pump, the goethite crystals become "tangled" and produce a very stable structure under static conditions. The more the slurry is pumped, the higher is the viscosity, until the system plugs up. The fibers of goethite range in size from about 0.2 to 0.7 micron long and about 0.01 to 0.05 micron thick. In the tangled condition, they form aggregates. The lateritic ore also contains round, very fine sized grain of less than 1 micron in size and ranging down to 0.01 micron.

The tendency for slurries to increase in viscosity during vigorous agitation is referred to in the art by the term "work hardening." This term is defined as an irreversible increase of the viscosity of the slurry during vigorous agitation, that is, irreversible while the slurry is subjected to very high shear stresses and when maintained in a static state after high shear stress agitation.

It would be desirable to provide means and process for reducing the viscosity of slurries subjected to high shear stresses during processing and avoid the use of costly fluidizing agents.

OBJECTS OF THE INVENTION

It is thus an object of the invention to provide a system for reducing the viscosity of "work hardened" slurries.

Another object is to provide a process for reducing the viscosity of "work hardened" slurries of ores containing metal values.

A still further object of the invention is to provide a process for reducing the viscosity of "work hardened" slurries employed in the hydrometallurgical treatment of lateritic and/or limonitic nickel-cobalt ore.

These and other objects will more clearly appear when taken in conjunction with the following disclosure and the accompanying drawing wherein:

STATEMENT OF THE INVENTION

Applicants have found that, by using a simple mechanical device to agitate gently the work hardened slurry, the viscosity of the slurry can be markedly reduced to levels of more than 50% below the original viscosity of the work hardened slurry.

A rotating drum is one embodiment of a simple device that can be employed in carrying out the invention, the drum being rotated at less than critical velocity, for example, 50% critical velocity, the rotating being such as to provide a linear velocity at the surface to generate shear forces in the slurry effective to produce gentle agitation of the mass and reduce the viscosity to a desired level more than 50% below the original viscosity of the work hardened slurry. Critical speed is defined as $$N(\text{rpm}) = 54.19/\sqrt{r}$$

where r is radius of the drum.

Another embodiment of the invention is directed to a process of reducing the viscosity of a work hardened slurry of pulp density of at least about 15% by weight of solids comprising, gently mechanically agitating a mass of said work hardened slurry confined in a container whereby to cause relative movement between said mass and a contacting surface of said container such that the mass of slurry is subjected to shear forces, the movement of said contacting surface being at a selected linear velocity sufficient to provide shear forces effective to reduce the viscosity to a desired level of more than 50% below the original viscosity, and continuing the gentle agitation at substantially said linear velocity until the viscosity has been reduced to said desired level.

Experiments have indicated that the viscosity of raw laterite slurries is a function of its shear history. High intensity shearing action increases substantially the viscosity of high density pulps. In other words, the viscosity of high density pulp (e.g. 35, 40 or 45% solids density) is very sensitive to high shear action, such as occurs in a centrifugal pump. As stated earlier, this phenomenon is irreversible in time but can be reversed by applying to the work hardened slurry gentle mechanical agitation in accordance with the invention, that is, by employing low intensity shearing action. It is believed that, in the case of raw laterite ores characterized by fibrous particles of geothite, the low intensity action disentangles the fibers of the slurry and aligns them relative to each other such as to reduce the viscosity of the slurry.

Normally, a suspension of these types of fibrous particles under conditions where the individual particles repel one another (i.e., well dispersed) will tend to arrange themselves into positions where their long axis are horizontal and parallel to each other. Under these conditions, the liquid phase will be uniformly distributed among all particles and the disperison will flow readily with minor disturbance. However, if such a dispersion is disturbed so suddenly that the particles do not have an opportunity to reorient in the newly established shear planes, the particles will become disoriented. Since, before disturbance, there is just enough liquid present to fill the void spaces in the mass, the volume increase on distortion leads to an increase in void volume, which of necessity draws fluid from adjacent undisturbed areas. This local reduction in liquid content greatly increases the viscosity in those areas, with the result that the suspension stiffens or solidifies.

It is believed that the disoriented particles may appear in two different forms: (a) bundles of particles that tend to adhere to one another, and (b) tangling of the particles (characteristic of electrical charges between prismatic and basal face.

Considering Case (a), the bundles will tend to be arranged more or less randomly, and the void volume of the mass (when the bundles are in contact with one another) will be rather large compared to the case described previously above (well dispersed particles). Moreover, it appears that the liquid phase will not be distributed uniformly through the mass since the liquid content of each agglomerate will tend to be less than the liquid content of the mass as a whole. Also, since the agglomerates attract and adhere to one another, any applied shear force must first overcome these attractions before any relative movement of particles can take place. After flow is initiated, much of the shear energy should be expended in either dragging agglomerates past one another or in actually deforming or disrupting the agglomerates; hence, the apparent viscosity of these types of suspension should be high; finally, any distortion or disruption of agglomerates by shear is normally irreversible; hence the viscosity characteristics of this type of system should also depend on the shear history of the suspension. Normally, since shear tends to reduce agglomerate size and thus increase exposed particle surface, the viscosity will increase the mechanical work (work hardening). For Case (b), it is obvious that the rheological properties will be similar to those of the bundle of particles system except that (1) the apparent viscosities should be higher for a given liquid content, and (2) the tangling of particles system should be more sensitive to irreversible changes in consistency with shear.

Whatever form the particles take, whether as bundles of particles or tangling of particles, gentle agitation will tend to align the particles relative to each other, that is in substantially parallel arrangement, so as to decrease the viscosity sufficiently to enable the slurry to flow more easily.

In the case of low-density slurries, the best results were obtained with low peripheral velocities of the aforementioned small rotating cylinder ranging from about 10 to 50 cm/sec; whereas, high-density slurries required a higher peripheral velocity of the order of magnitude of about 100 cm/sec. The observed trend between peripheral velocity and density is approximately linear.

A test conducted with a 55 gallon rotating drum under batchwise and in-line (pilot plant) conditions with low-density slurries (about 20% solids) showed good results in decrease of viscosity using linear peripheral velocities stated hereinabove. However, a retention time of over 60 minutes was required to reach the desired viscosity level. It appears that the required retention time for both high and low-density slurries is roughly a function of the surface area to volume ratio of the drum. The larger the surface area per cubic volume, the shorter is the residence time.

This will clearly appear from the following analysis:

$D$ = diameter of cylinder  (1)

$L$ = length of cylinder  (2)

$V$ = volume of cylinder  (3)

$A$ = peripheral surface area of cylinder  (4)

$A{:}V$ ratio based on a drum half-full with slurry is as follows:

$A = \pi DL/2$  (5)

$V = (\pi D^2 L/4) \times \frac{1}{2}$  (6)

$A/V = (\pi DL/2)/(\pi D^2 L/8) = 4/D$  (7)

As will be noted, the ratio of the peripheral surface area or slurry contact area to the diameter of the drum is $4/D$. As the diameter increases (inches), the area to volume ratio decreases as shown in the following table:

| Diameter | | $A/V = \frac{4}{D}$ (Inches) | $A/V = \frac{4}{D}$ (Centimeters) |
|---|---|---|---|
| 4 inches | 10.02 Cms | 1. | 0.4 |
| 6 | 15.2 | 0.67 | 0.26 |
| 10 | 25.4 | 0.4 | 0.158 |
| 20 | 50.8 | 0.2 | 0.08 |
| 30 | 76.2 | 0.13 | 0.051 |
| 50 | 127.0 | 0.08 | 0.031 |

Figure 1:
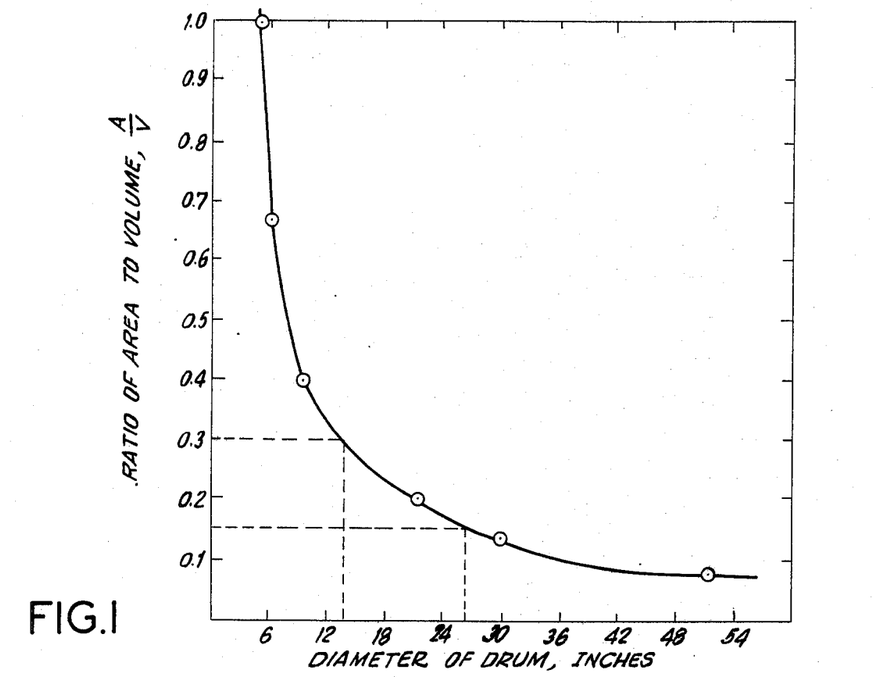
FIG. 1 depicts the relationship between the area of contact of a mass of pulp in a drum with the drum volume.

The foregoing relationship in inches is shown in FIG. 1. A ratio of A to V of over 0.15 to about 1 is preferred (or over 0.06 to about 0.4 based on centimeters), a more desirable ratio being at least about 0.3 to 1 (or about 0.12 to 0.4 based on centimeters) which is above the knee of the curve of FIG. 1.

Since it was observed that large diameter drums tend to increase residence time, tests were conducted with a drum built with alternating rotating and stationary discs within the drum to provide maximum surface contact of the parts with the slurry. The results with this type of drum (FIG. 12) gave good relaxation of viscosity on a batch test at short periods of time as will be shown hereinafter.

EXAMPLE 1

Tests were conducted using work hardened slurries ranging in density from about 15 to 21% solids.

A series of small cylinders or spools was used ranging in diameter from 4 inches to 12 inches. Three lengths were tested (6 inches, 12 inches and 18 inches) for a nominal diameter of 4 inches.

The slurry employed was composed of limonitic nickel cobalt ore of particle size below 65 mesh.

The parameters investigated were retention time, speed, dimensions of the cylinders, slurry density (15 to 21%), and percentage of available volume of the cylinder occupied by the slurry. The viscosity was measured before and after rolling using a Brookfield viscometer at 6 RPM (Brookfield Engineering Laboratories, Inc., Stoughton, Mass.).

Influence of Retention Time and Speed

Retention times were investigated between 0 and 20 minutes at peripheral velocities from 0 to 80 cm/sec.

Figure 2:
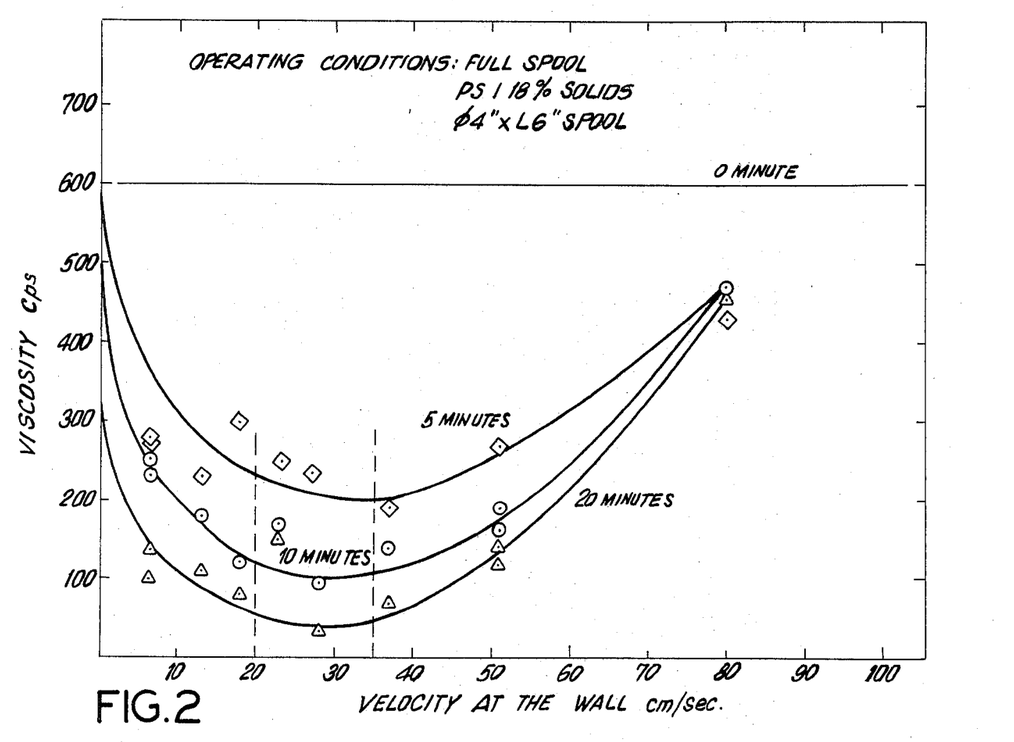
FIGS. 2 and 3 are curves showing the influence of gentle agitation by drum rolling on decreasing slurry viscosity of a work hardened slurry.

The results of tests conducted with a full cylinder (4 inches diameter by 6 inches long) at 18% solids density are illustrated by FIG. 2 which shows the effect of peripheral (wall) velocity and time in decreasing viscosity of the work hardened slurry which had a viscosity at zero time of about 600 Cps. As will be apparent, optimum velocity for achieving optimum decrease in viscosity at residence times of 5, 10 and 20 minutes ranges from about 20 to 35 cm/sec. As will be noted, the optimum decrease in viscosity is more than 50% below the original viscosity of about 600 Cps at 5 minutes or more of residence time.

Figure 3:
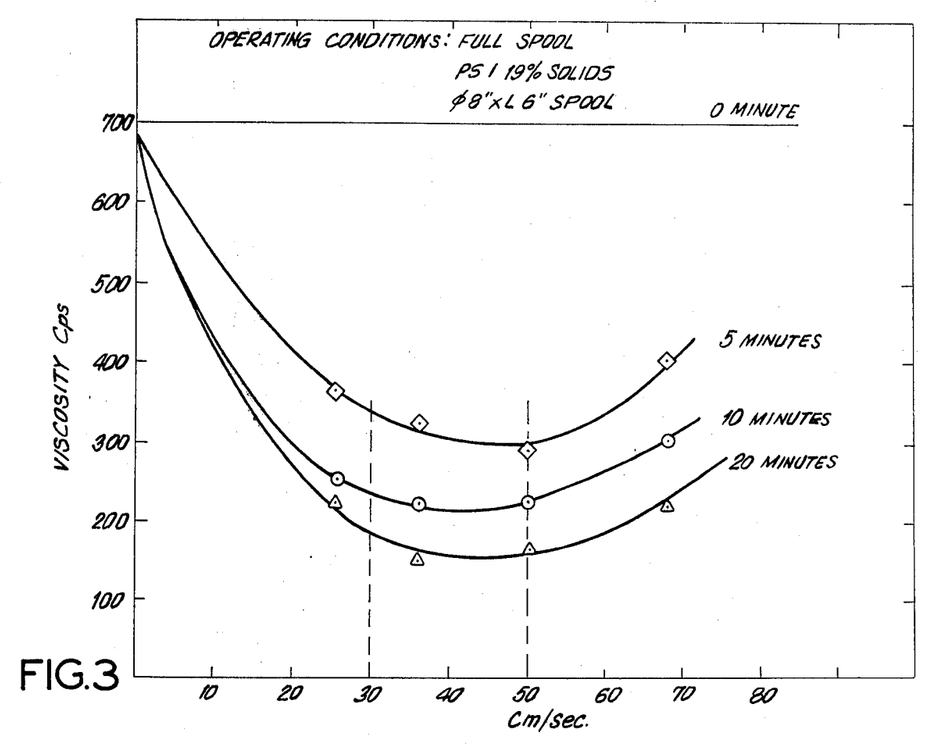

An example of the influence of time and peripheral speed on the viscosity of the slurry for an 8 inch diameter and 6 inch long cylinder or spool is depicted in FIG. 3 at 19% solids density. As will be noted, optimum results were obtained at peripheral speeds of about 35 to 50 cm/sec., the intial viscosity of about 700 Cps being reduced to more than about 50% at residence times of over 5 minutes to 20 minutes in the rotating cylinder.

Influence of Slurry Densities

Figure 4:
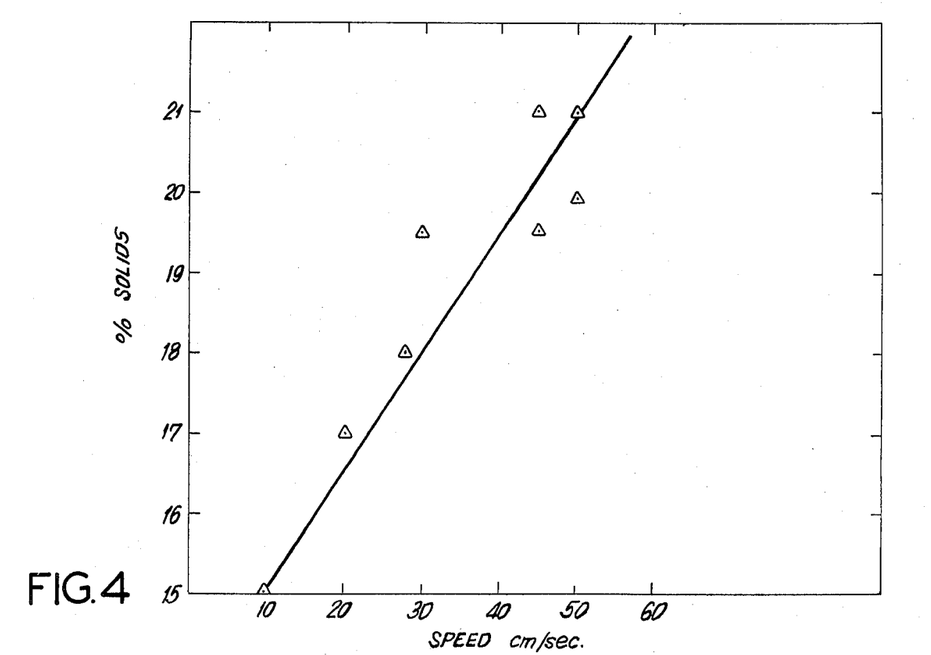
FIG. 4 is a plot depicting the relationship between optimum speed and slurry density in achieving optimum decrease in viscosity of a work hardend slurry.

Tests were carried out to determine the relationship between slurry densities of about 15 to 21% solids and peripheral velocities at a residence time of 20 minutes in obtaining optimum reduction in viscosity. Referring to FIG. 4, it will be noted that the peripheral speed to obtain optimum reduction in viscosity is substantially directly related to slurry density, higher peripheral speeds being required for higher densities.

Viscosity Reduction of Low-Density Slurries on Pilot Plant Scale

A 55 gallon drum (22.5 inches diameter and 33 inches long) was employed in a batch test to relax a slurry containing 19.2% solids, the slurry having been work hardened to a viscosity level of about 650 to 700 Cps. The optimum peripheral velocity of the drum was found to be substantially consistent with values obtained in tests discussed hereinbefore, although a longer time was required to lower the viscosity to an equivalent level (note FIGS. 5 and 6).

Figure 5:
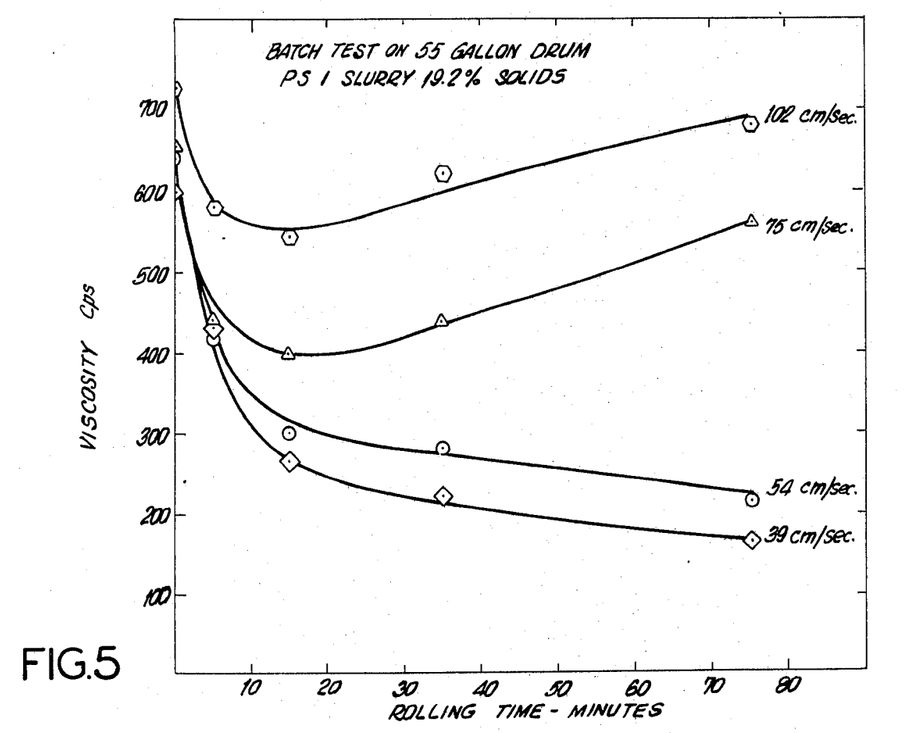
FIGS. 5 and 6 are a series of curves showing results obtained with a 55 gallon drum in decreasing viscosity of a work hardened slurry at various wall velocities of said drum.

Referring to FIG. 5, it will be noted that an optimum decrease in viscosity is obtained at 39 and 54 cm/sec peripheral velocities, respectively; whereas, at higher velocities of 75 and 102 cm/sec, the viscosity tends to increase after 20 minutes of residence time, thus indicating that too high a peripheral velocity can result in an increase in work hardening following an initial drop. However, one of the disadvantages of working with a large drum is that, in order to use longer peripheral velocities to achieve the desired decrease in viscosity, a substantially lower rotational speed must be used which leads to "sanding out" of the solids, that is, a settling out of the particulate material.

Moreover, the use of larger sized drums requires a much longer residence time to achieve minimum viscosity due apparently to the fact that there is less area of contact on an area to volume ratio (of the solids) in the drum. Referring to FIG. 5, it will be observed that the viscosity at peripheral velocities of the drum of 39 and 54 cm/sec was decreased to more than 50% of the original viscosity of about 650 to 700 Cps after 30 minutes of rotation and decreased still further at 75 minutes; whereas, referring to FIG. 2, very low viscosity was achieved after 5 or 10 minutes for the smaller container.

Figure 6:
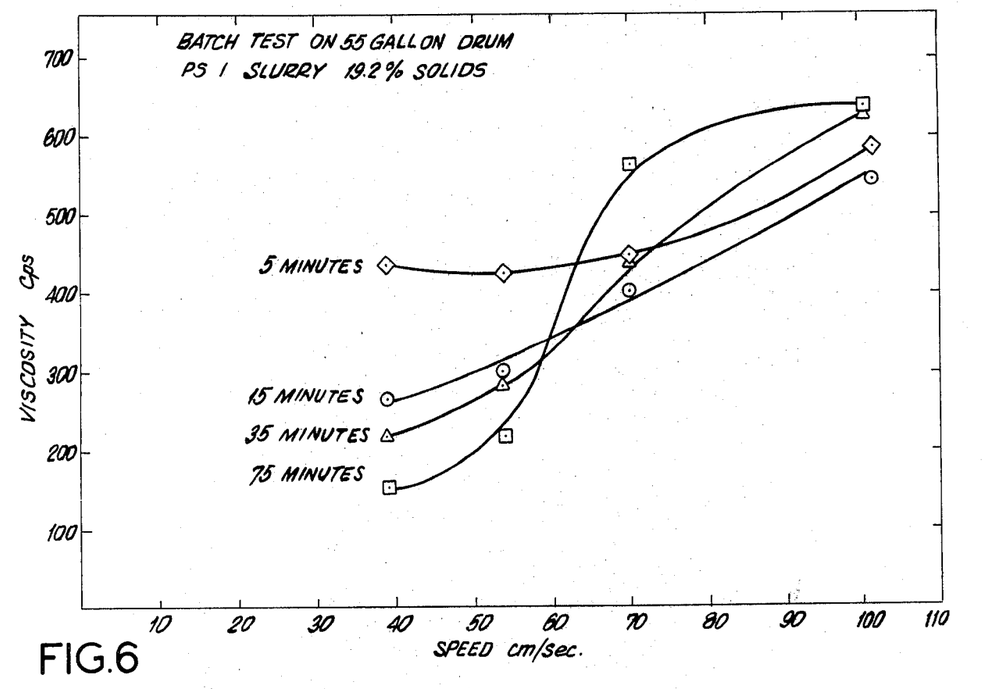

The effect of peripheral velocity on viscosity at constant values of residence time is shown in FIG. 6 for the 55 gallon drum, the lower peripheral velocities being preferred for large drums at residence times of 15 to 75 minutes.

The 55 gallon drum was also tested in-line in a pilot plant. At a retention time of about 10 minutes at nominal flow-rate of slurry in the circuit and a peripheral velocity of 60 cm/sec, the viscosity decreased from a work hardened viscosity of about 650 to 260 Cps, that is, over a 50% decrease. However, because the rotational speed is lower at the aforementioned peripheral velocity, a settling out of the solids tended to occur in the drum.

When a still larger drum was employed, the viscosity did not decrease sufficiently to provide the desired results, due apparently to the fact that the area to volume ratio (contact area to the volume of the slurry) was too low. However, it was found that this deficiency could be compensated for by using a container of the type shown in FIG. 12 at which maximum contact area is provided for by using rotating and stationary discs within the drum.

Viscosity Reduction of High Density Slurries

In working with high density slurries, e.g., up to about 50% solids by weight, it was observed that the required optimum peripheral velocity is higher than in low-density slurries. This trend is noted in FIG. 4. The higher the solids density, the higher is the work hardened viscosity and ultimately the higher the minimum viscosity obtained; however, the final viscosity is more than 50% below the initial viscosity. The relationship of minimum viscosity vs. percent solids is illustrated in FIG. 7.

Figure 7:
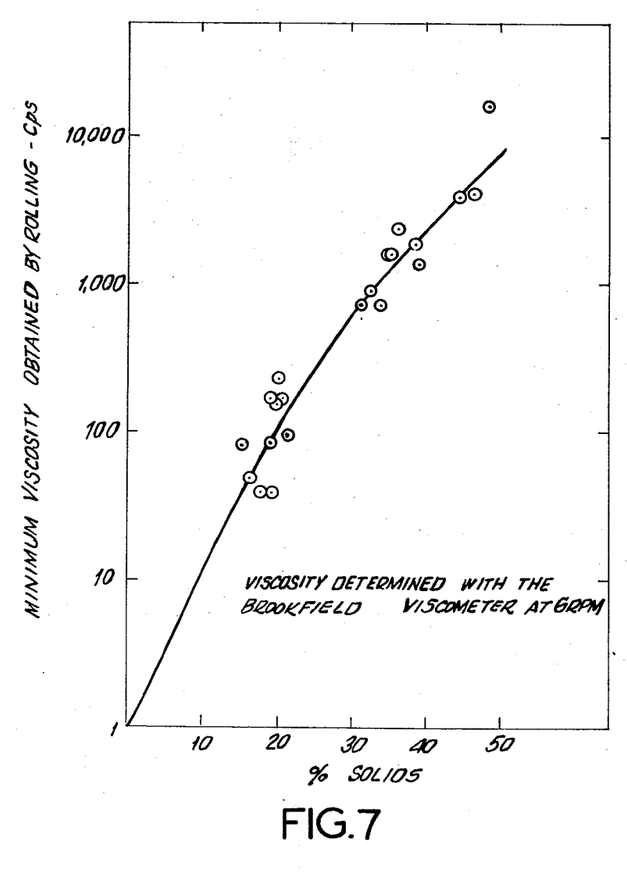
FIG. 7 depicts a curve showing minimum viscosity obtained after gentle agitation by rolling as a function of percent solids in the slurry.

Referring to FIG. 7, it can be seen that the viscosity after relaxation is considerably lower than the initial work hardened viscosity. For example, the viscosity of a thickener underflow at 45% solids as measured by the Brookfield viscometer is generally more than 100,000 Cps and, following relaxation in accordance with the invention, about 4000 Cps.

Viscosity Reduction of High Density Slurries on a Pilot Plant Scale

Figure 8:
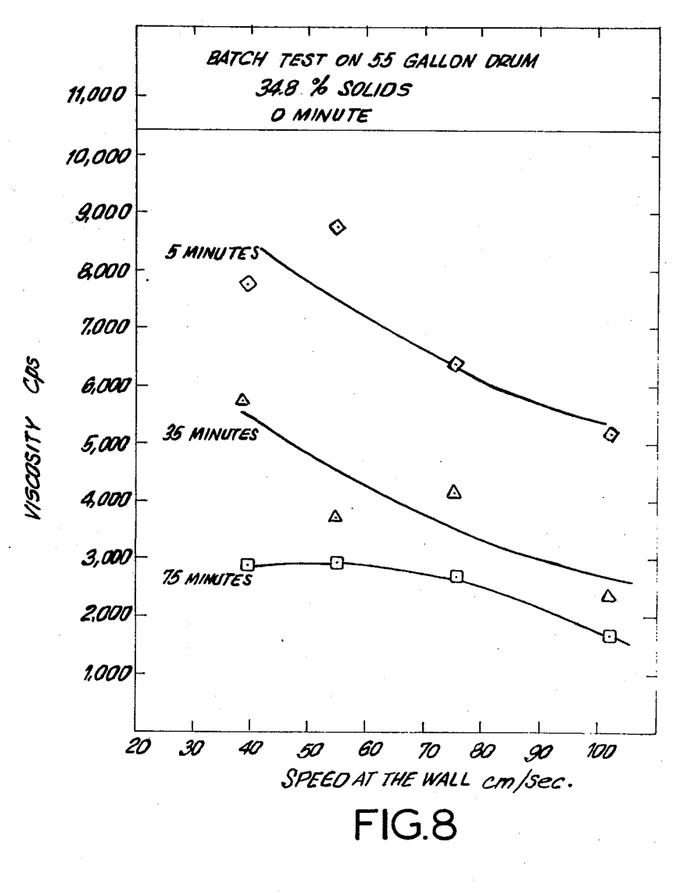
FIG. 8 depicts curves showing the influence of wall speed of a 55 gallon drum on the viscosity of a work hardened slurry.
Figure 9:
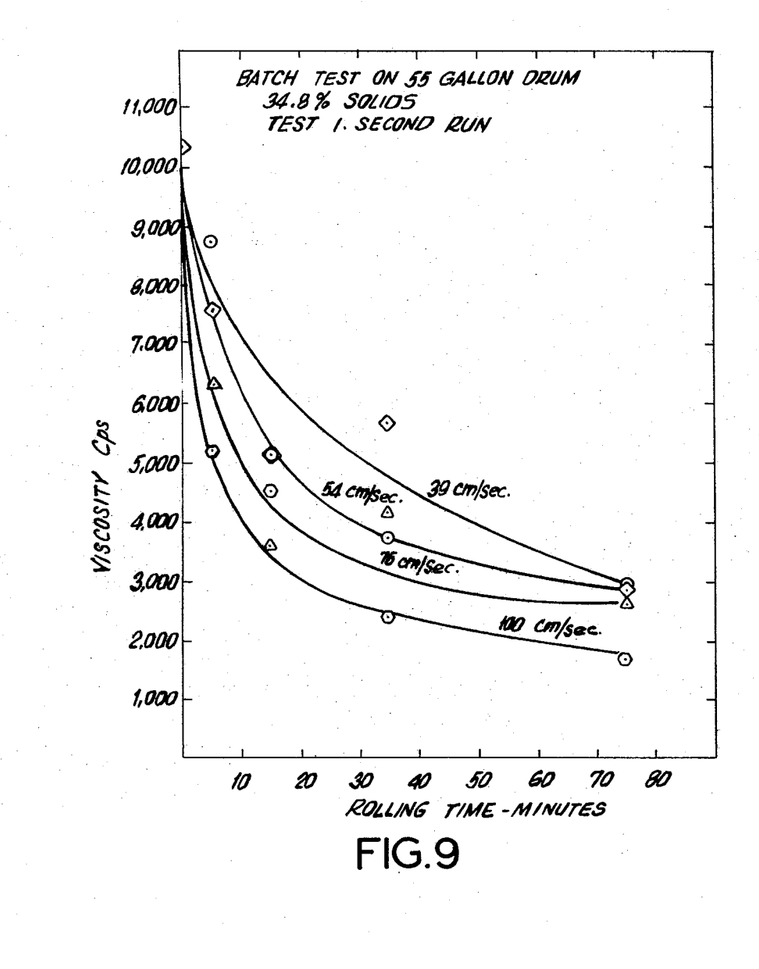
FIGS. 9 and 10 are curves showing the influence of drum rolling time (that is, retention time) on the viscosity of work hardened slurries.

A batchwise test was conducted using a 55 gallon drum and a slurry containing 34.8% solids and having a viscosity at zero time of approximately 10,500 Cps. Good results were obtained as evidenced by the data of FIGS. 8 and 9. As will be noted, best results are obtained at the higher levels of peripheral velocity of the drum.

Figure 10:
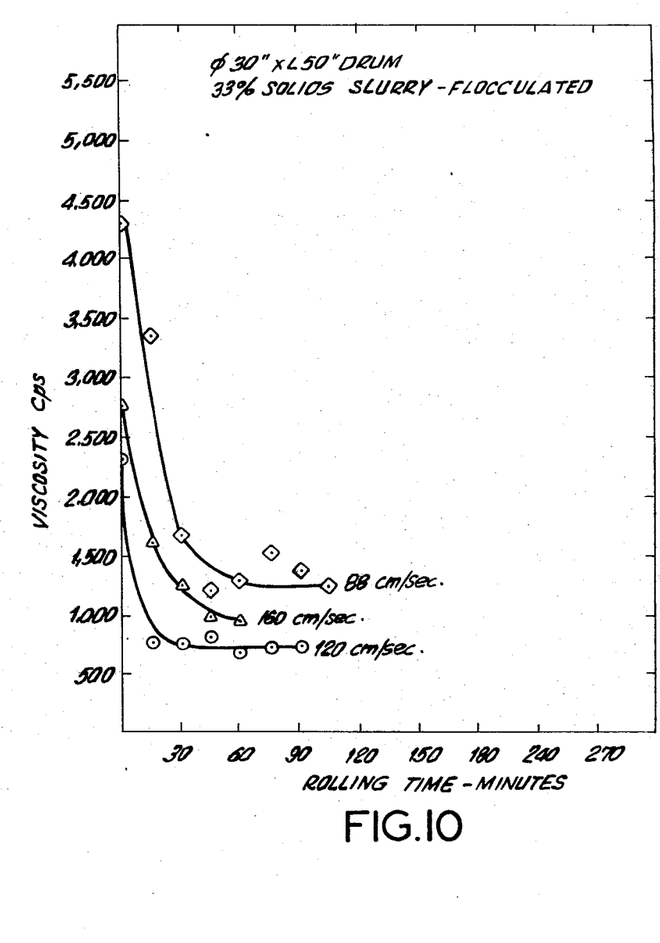
Figure 11:
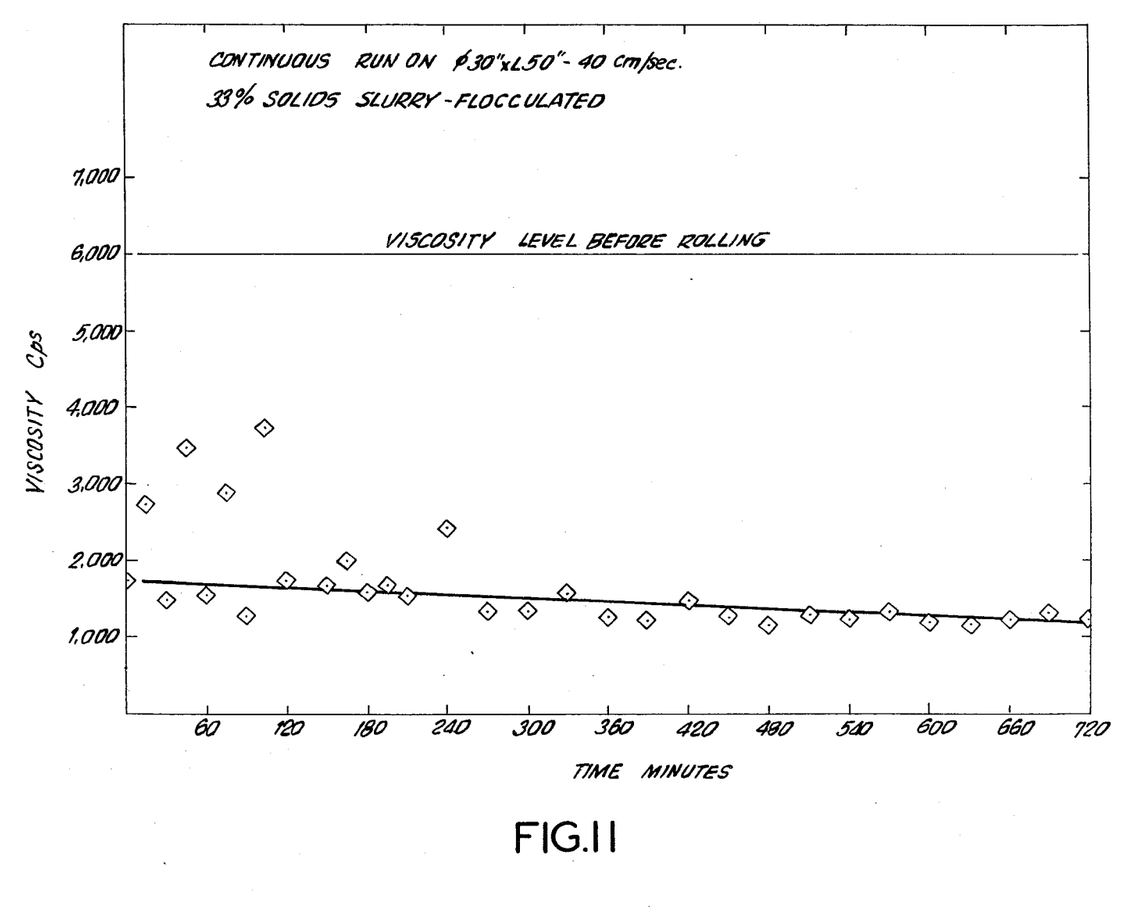
FIG. 11 is a plot showing the viscosity of a slurry during a 12 hour continuous run through a rotating relaxing drum.

A larger drum measuring 30 inches in diameter and 50 inches long was used in a batch test with a slurry containing 33% solids (flocculated). Good results were obtained at residence times of over 30 to 60 or 90 minutes (FIG. 10) in which the viscosity was decreased by over 50% below the initial viscosity in each test, the best results being obtained at higher peripheral velocity levels. This drum was placed in-line in the pilot plant and good relaxation in viscosity was obtained at residence times of about 60 minutes. The results obtained are shown in the data of FIG. 11.

Figure 12:
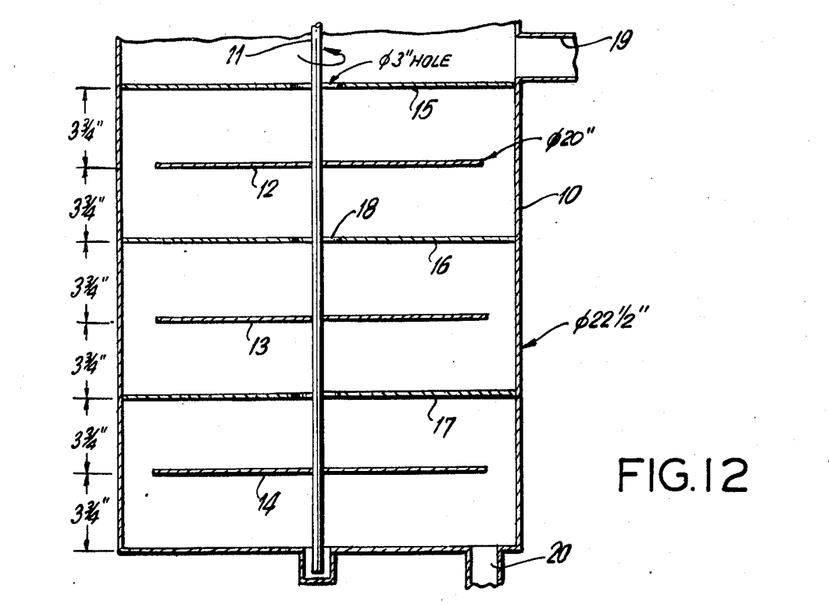
FIG. 12 is a schematic cross section of a rotating disc relaxing unit of the type employed in obtaining the results shown in FIG. 11.
Figure 13:
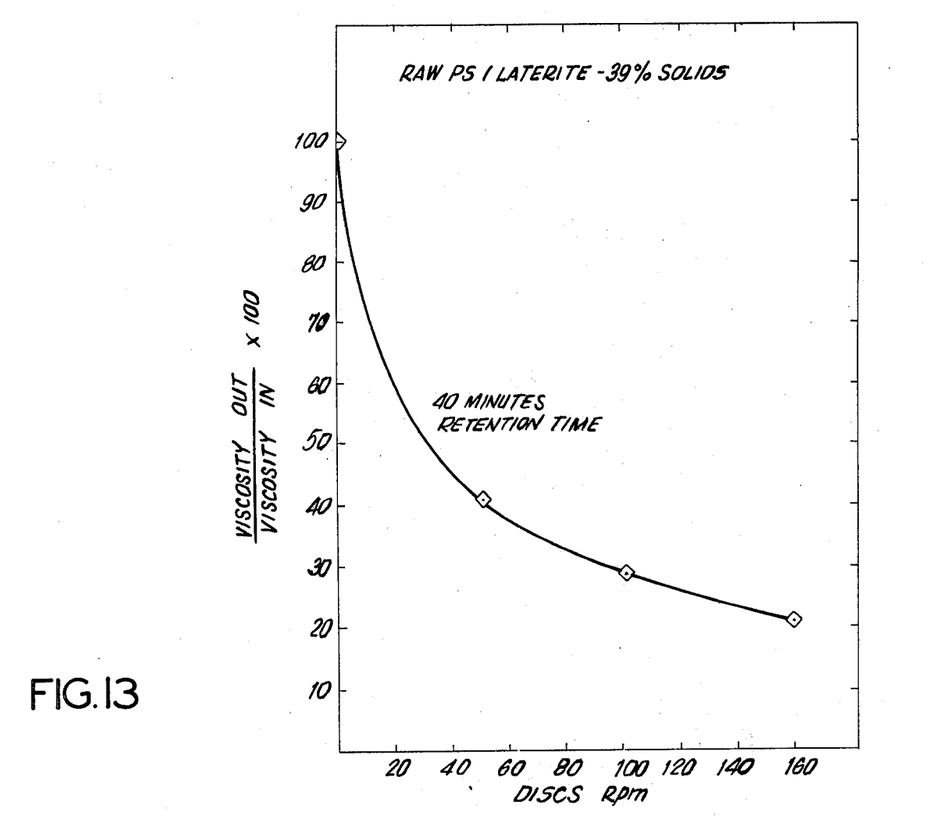
FIG. 13 is a curve depicting the decrease in viscosity of a raw laterite ore slurry using the rotating disc assembly of FIG. 12.

Because test results indicated that the use of larger drums required loner residence times due apparently to the fact that the ratio of area of contact of the slurry in the drum to the volume of the slurry is low (note FIG. 1), a container or relaxing unit using rotating discs was employed of the type illustrated in FIG. 12, the relaxing unit being stationary and having a diameter of about 22.5 inches and a length or height of 22.5 inches. The relaxing unit 10 is provided with a stirrer 11 having discs 12, 13 and 14 mounted perpendicularly and concentrically thereon in spaced relationship, the discs being 20 inches in diameter. The unit has stationary annular discs or partitions 15, 16 and 17 mounted therein at the wall thereof and extending radially to the center thereof, the stationary discs having a central opening 18 (3 inch diameter) through which the stirrer shaft extends. Thus, each rotating disc is disposed between a pair of partitions as shown. The relaxing unit has an entrance or inlet port and an exit or outlet port 20.

As will be noted from FIG. 12, maximum area of contact is provided with the slurry flowing into and through the container, the area of contact including each side of the discs and partitions, as well as the wall of the container.

Thus, calculating the total inside area of the container, taking into account the 3 inch diameter opening of the partitions, an area to volume ratio of the device of approximately 1.5 is obtained.

As will be observed, for foregoing construction provides an area to volume ratio which appears on the high part of the curve beyond the limit shown in FIG. 1 determined for simple cylinders of diameter ranging from 4 to 50 inches. Thus, by using the design shown in FIG. 12, a large drum is given the equivalent capability of a small sized drum insofar as contact area is concerned.

As pointed out hereinbefore, longer retention times are required for the larger size conventional drums.

Using the container of FIG. 12, good results were obtained at a residence time of 40 minutes on a slurry of 39% solids density. As will be observed, the percent drop in viscosity was over 50% at a rotational disc velocity of at least about 40 RPM. This velocity corresponds to an average surface velocity of the disc on contact with the slurry of at least about 17 cm/sec., the peripheral velocity of the disc (the outer diameter) being 34 cm/sec, the peripheral velocity at the axis being taken as zero, the average surface velocity of the disc being determined as (0 + 34)/2 or 17 cm/sec. Minimum viscosity was obtained at about 160 RPM which provides an average surface velocity of the discs of about 68 cm/sec.

As stated hereinbefore, the mass of work hardened slurry or pulp is gently agitated to provide sufficient shear stresses within the mass to reduce the viscosity to more than 50% below its original work hardened viscosity. The desired conditions as to velocity and time for a particular work hardened slurry of a particular pulp density can be easily determined by tests of the type illustrated by the data of FIGS. 2 to 11, the optimum conditions being determinable from several test runs.

The area to volume ratio of the mixing device or container employed to reduce the viscosity should preferably be over about 0.15 based on dimensions in inches (or over 0.06 based on centimeters) for the average diameter of the device, preferably at least about 0.3 (or at least about 0.12 based on centimeters) and above. The area to volume ratio is useful in designing the mixing container, especially one in which vanes or discs are employed internally to increase the area of contact of the mass of slurry within the container or drum. In the case of a simple rotating drum or cylinder, the ratio of the peripheral area (wall) of the drum to its volume in cubic inches is a good measure of what to expect from the drum, whether the drum is ⅓, ½ or ¾ full during rotation.

As illustrative of the invention, the following further example is given.

EXAMPLE 2

A slurry of about 18% solids density is centrifugally pumped to a leaching circuit, the centrifugal pump resulting in a work hardened pulp of viscosity of over 600 Cps. The pulp is increased in density to about 35% solids by settling and the work hardened pulp passed through a relaxing unit of the type and size shown in FIG. 12. This viscosity of the high solids pulp on entering the device was about 10,000 Cps, the rate of travel through the relaxing unit being such as to provide a residence time in the unit of about 30 minutes, the discs being rotated at about 120 RPM to reduce the viscosity at least 75% below the work hardened viscosity of the pulp entering the unit.

The relaxed slurry is then passed to an acid make-up station where about 0.2 lbs. of sulfuric acid is added per pound of slurry on the dry basis, the acidified slurry being then subjected to high pressure leaching in an autoclave under the following conditions: at 270° C for about 60 minutes at a pressure of about 775 psig (55 Kg/cm$^2$). Following leaching, the pregnant leach solution is separated from the remaining pulp by countercurrent decantation and the leached pulp separated as a tailings after neutralization.

Figure 14:
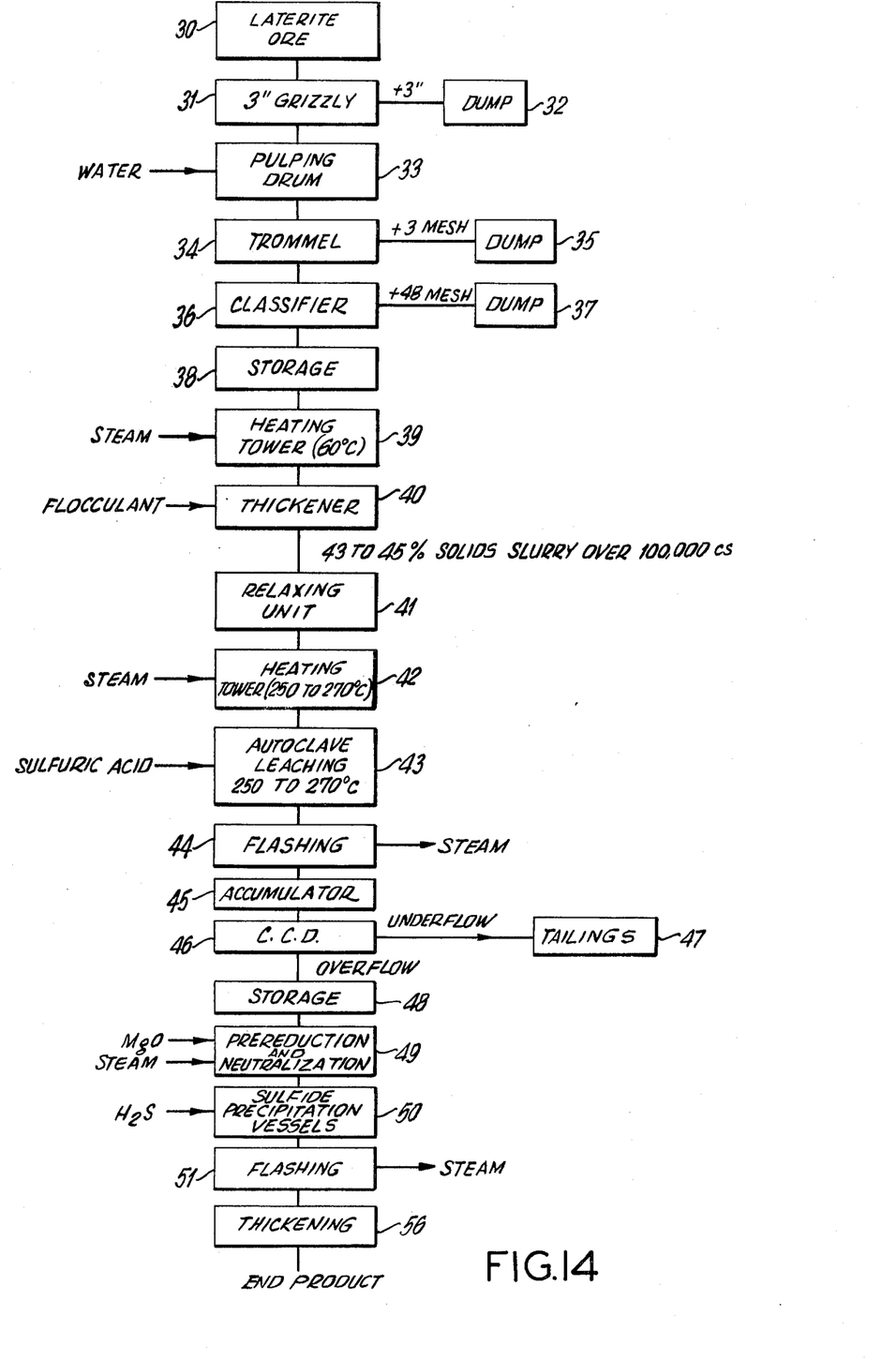
FIG. 14 is a typical flow sheet for treating laterite ore showing the use of a relaxing unit in accordance with the invention.

An overall flow sheet for treating laterite ore and utilizing the invention is illustrated in FIG. 14.

Laterite ore 30 is fed to a grizzly 31 to remove 3 inch oversize which is sent to dump 32. The ore leaving the grizzly is then pulped at 33 and fed to trommel screen 34 and 3 mesh oversize removed and sent to dump 35. The pulp is passed from stage to stage by pumping.

The pulp leaving trommel 34 is pumped to classified 36 and 48 mesh oversize removed and sent to dump 37. The classified pulp is sent to storage 38 and subsequently preheated to about 60° C at 39 and thickened at 40.

The pulp at the thickener has a solids density of about 43 to 45% and a viscosity of over 100,000 Cps due to the pumping between various stages of the flow sheet and to the thickening at 40.

Because of the high viscosity, the thickened pulp is passed through the relaxing unit of the invention where the viscosity is decreased to below 10,000 Cps, e.g. to about 4,000 Cps.

From relaxing unit 41, the pulp is passed to a heating tower 42 where it is heated to about 250° C to 270° C under pressure, the heated pulp going to autoclave 43 at 250° C to 270° C where sulfuric acid in an amount of 0.2 lbs. is added per pound of dry weight of ore. The ore is leached at a pressure of about 775 psig (55 Kg/cm$^2$) for about 60 minutes.

The leached pulp is flashed to steam at 44, passed into accumulator 45 after which it is subjected to countercurrent decantation at 46, with the underflow going to tailings 47.

The overflow or pregnant solution is sent to storage 48, following which it is neutralized with MgO at 49 preparatory to sulfide precipitation of the metal values nickel and cobalt under elevated temperature and pressure with $H_2S$ at 50. Following precipitation, the solution is flashed to steam at 51 and the sulfide precipitate thereafter thickened at 56. The thickened sulfide precipitate is thereafter subjected to oxidation leaching at elevated temperature and pressure with sulfuric acid to produce a nickel solution of fairly high concentration, e.g. 50 to 75 grams per liter of nickel, from which nickel is later recovered.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What we claim is:

1. A process of reducing the viscosity of a work hardened slurry of finely divided ore having a pulp density of at least about 15% by weight of solids which comprises, gently mechanically agitating a mass of said work hardened slurry confined in a container whereby to cause relative movement between said mass and a contacting surface such that said mass is subjected to shear forces,
      the relative movement with respect to said contacting surface being at a selected linear velocity sufficient to provide shear forces in said agitated mass in contact therewith effective for reducing the viscosity to a desired level more than 50% below the original viscosity,
   and continuing said agitation at substantially said selected linear velocity until the viscosity has been reduced to said desired level.

2. The process of claim 1, wherein the pulp density of said slurry ranges from about 15 to 50% solids by weight and wherein said agitation is carried out to provide a linear velocity of said contacting surface substantially directly related to said pulp density.

3. A process of reducing the viscosity of a work hardened slurry of finely divided lateritic and/or limonitic nickel-cobalt ore having an pulp density of at least about 15% by weight of solids which comprises, gently mechanically agitating a mass of said work hardened slurry confined in a container whereby to cause relative movement between said mass and a contacting surface such that said mass is subjected to shear forces,
      the relative movement with respect to said contacting surface being at a selected linear velocity sufficient to provide shear forces in said agitated mass in contact therewith effective for reducing the viscosity to a desired level more than 50% below the original viscosity,
   and continuing said agitation at substantially said linear velocity until the viscosity has been reduced to said desired level.

4. The process of claim 3, wherein the pulp density of said ore slurry ranges from about 15 to 50% solids by weight and wherein said agitation is carried out to provide a linear velocity of said contacting surface substantially directly related to said pulp density.

5. A process of reducing the viscosity of a work hardened finely divided lateritic and/or limonitic ore slurry having a fibrous crystal structure in which the fibers are disoriented, said slurry having a pulp density of at least about 15% by weight of solids which comprises, gently mechanically agitating a mass of said work hardened slurry confined in a container whereby to cause relative movement between said mass and a contacting surface such that said mass is subjected to shear forces,
      the relative movement with respect to said contacting surface being at a selected linear velocity sufficient to provide shear forces in said agitated mass in contact therewith effective to align said disoriented fibers and reduce the viscosity to a desired level,
   and continuing said agitation at substantially said selected linear velocity to effect substantially the alignment of said fibers and reduce the viscosity to said desired level.

6. The process of claim 5, wherein the pulp density of said slurry ranges from about 15 to 50% solids by weight and wherein said agitation is carried out to provide a linear velocity at said contacting surface substantially directly related to said pulp density.

7. The process of claim 5, wherein the area of the contacting surface of the container to the volume of the container is over about 0.15 based on container dimensions measured in inches.

8. A process of reducing the viscosity of work hardened finely divided lateritic and/or limonitic ore slurry characterized by the presence of disoriented fibrous goethite crystals ranging in average size from about 0.2 to 0.7 micron long and about 0.01 to 0.05 micron thick and having a pulp density of about 15 to 50% by weight of solids which comprises, gently mechanically agitating a mass of said work hardened slurry confined in a container whereby to cause relative movement between said mass and a contacting surface such that said mass is subjected to shear forces,
      the area of said contacting surface of said container to the volume of said container being over about 0.15 based on container dimensions measured in inches, the relative movement with respect to said contacting surface being at a selected linear velocity sufficient to provide shear forces in said agitated mass in contact therewith effective to align said disoriented fibrous goethite crystals and reduce the viscosity to a desired level, and continuing said agitation at substantially said selected linear velocity to effect substantially the alignment of said fibrous goethite crystals and reduce the viscosity to the desired level.

9. The process of claim 8, wherein the area of the contacting surface to the volume of the container measured in inches is at least about 0.3.

10. A process of reducing the viscosity of a work hardened slurry having a pulp density of at least 15% by weight of solids which comprises, gently mechanically agitating a mass of said work hardened slurry in a rotating cylinder rotating at less than critical speed, whereby to cause relative movement between said mass and the peripheral surface of said rotating cylinder such that said mass is subjected to shear forces, the movement of said peripheral surface being at a linear velocity sufficient to provide shear forces in said agitated mass effective for reducing the viscosity to a desired level more than 50% below the original viscosity, and continuing said agitation at substantially said linear velocity until the viscosity has been reduced to said desired level.

11. The method of claim 10, wherein the pulp density of said slurry ranges from about 15 to 50% solids by weight and wherein said agitation is carried out to provide a linear velocity at said contacting surface substantially directly related to said pulp density.

* * * * *